Patented Sept. 2, 1947

2,426,709

UNITED STATES PATENT OFFICE 2,426,709

STABILIZATION OF MOTOR FUELS

Thomas Carl Roddy, Jr., Port Arthur, Tex., assignor to The Texas Company, New York, N. Y., a corporation of Delaware No Drawing. Application May 6, 1943,
Serial No. 485,894

7 Claims. (Cl. 44—59)

My invention relates to motor fuels, and particularly to the stabilization of motor fuels which tend to deteriorate on storage and when exposed to sunlight.

It is well known that certain gasolines, and especially those containing tetraethyl lead, tend to deteriorate on storage or when exposed to sunlight, unless stabilizing agents are incorporated in the fuels. On exposure to sunlight, such unstable gasolines may discolor or form a haze or precipitate. Usually, both of these phenomena take place, especially if the gasoline contains tetraethyl lead. Unstable gasolines containing dyes also tend to change in color or bleach on exposure to sunlight. These various forms of deterioration in appearance and quality of the fuels, after exposure to sunlight, may or may not be accompanied by the additional phenomenon of gum formation on storage.

Although numerous agents have been proposed for stabilizing gasolines against gum formation, there are very few effective agents for stabilizing against deterioration during exposure to sunlight. Up to the present time, the best stabilizers for the latter purpose comprise the combinations of phosphatides and phenols disclosed in U. S. Patent 2,165,651 of Rees et al. Combinations of lecithin and cresylic acid, for example, have been found to be definitely beneficial in improving sunlight stability.

I have now found that superior stabilizing agents, especially useful for inhibiting haze formation on sunlight exposure, comprise combinations of phenols and unsaturated fatty acids. Such stabilizing combinations are particularly advantageous in improving the sunlight stability of leaded gasolines of relatively high tetraethyl lead content.

My preferred stabilizing agents comprise combinations of oleic acid and phenols, and my invention will be specifically illustrated with reference to a stabilizing agent of this type. Oleic acid is a desirable component of my stabilizing compositions both from the standpoint of cost and from the standpoint of its haze-inhibiting activity in conjunction with phenols. This acid may be employed in a pure form, if desired, but less expensive commercial acid, such as Red Oil or Elaine, will usually be found to be quite satisfactory. Although oleic acid is the preferred fatty acid component of my stabilizing agents, it is to be understood that other equivalent unsaturated fatty acids may be substituted for oleic acid, if desired.

The term "unsaturated fatty acids," as used herein, is to be construed as signifying unsaturated aliphatic monocarboxylic acids having at least 16 carbon atoms, and preferably those of the type $C_nH_{2n-2}COOH$ which are derivable from animal or vegetable fats. Oleic, elaidic, and erucic acids are the best known unsaturated fatty acids of the latter type.

The phenols which may be used in conjunction with unsaturated fatty acids in the compositions of my invention may be any of the phenolic compounds which have previously been used in conjunction with phosphatides, as disclosed in U. S. Patent 2,165,651 referred to above. I generally prefer to employ mono-cyclic phenols, and especially the mono-hydroxy mono-cyclic phenols which contain alkyl substituents on the aromatic ring. The cresols are especially suitable for this purpose, and commercial cresylic acid constitutes a cheap and effective component of my stabilizing agents. Other substituted phenols may also be employed, and the amino-alkyl phenols are especially advantageous in inhibiting gum formation as well as co-acting with the oleic acid to improve sunlight stability.

It is to be understood, of course, that other stabilizing agents or fuel additives may be used in conjunction with the particular stabilization combinations of the present invention. For example, when employing a sunlight stabilizing combination which is not a strong gum inhibitor, an additional agent may be incorporated to stabilize the fuel against gum formation. Similarly, any of the usual antiknock agents, dyes, and other fuel additives may be used in conjunction with the present sunlight stabilizer, and my stabilizing combinations are particularly advantageous in fuels containing tetraethyl lead and oil-soluble azo dyes.

The amounts of stabilizing agents to be employed will, of course, depend upon the degree of instability of the particular fuel. However, in any case, very small amounts of stabilizing agents are required, in most instances, a matter of only a few pounds per thousand barrels of fuel. Amounts of unsaturated fatty acid ranging from 1 to 30 pounds per thousand barrels of fuel, and amounts of liquid phenols ranging from 1 to 15 gallons per thousand barrels of fuel will usually be sufficient.

My invention may be further illustrated by the following specific example:

EXAMPLE

A fuel comprising 50% cracked gasoline, 45% straight run gasoline, and 5% natural gasoline, containing 1.5 c. c. of tetra-ethyl lead per gallon, and dyed bronze with 0.053 gm. of "Calcogas Yellow" and 0.0038 gm. of "Ethyl Red" per gallon, was exposed to sunlight in a glass vessel for a period of four hours, and the time of initial haze formation was noted. Similar samples of the same gasoline containing stabilizing agents in the amounts shown below, were likewise exposed, and the times of haze formation were noted. The results of duplicate tests are shown in the table below:

Table

| Stabilizing Agent | Hours Until Initial Haze | Improvement Over Blank |
|---|---|---|
| None (Blank) | ¼ | |
| 20 lbs. oleic acid per 1000 barrels | ½ | ¼ |
| 6 gals. cresylic acid per 1000 barrels | ½ | ¼ |
| 20 lbs. oleic acid and 6 gals cresylic acid per 1000 barrels | 4+ | 3¾+ |

It is evident from the above results that the effect of the unsaturated acid-phenol combination is much greater than the additive effects of the separate components.

It is to be understood, of course, that the above example in no way limits the scope of my invention, and that other combinations of stabilizing agents of the classes described may be substituted for the specific combinations of the example. In general, it may be said that the use of any equivalents or modifications which would naturally occur to one skilled in the art is included in the scope of my invention. Only such limitations should be imposed on the scope of my invention as are indicated in the appended claims.

I claim:

1. A stabilized motor fuel comprising gasoline normally tending to deteriorate on storage, and containing small amounts of an unsaturated fatty acid and a phenol.

2. A stabilized motor fuel comprising gasoline normally tending to form haze on sunlight exposure, and containing small amounts of oleic acid and a phenol.

3. A stabilized motor fuel comprising gasoline normally tending to form haze on sunlight exposure, and containing small amounts of oleic acid and cresylic acid.

4. A stabilized motor fuel comprising gasoline and tetraethyl lead, said motor fuel normally tending to deteriorate on exposure to sunlight, and containing small amounts of an unsaturated fatty acid and a phenol.

5. A stabilized motor fuel comprising gasoline and tetraethyl lead, said motor fuel normally tending to form haze on exposure to sunlight, and containing small amounts of oleic acid and cresylic acid.

6. A stabilized motor fuel comprising gasoline, tetraethyl lead, and an oil-soluble azo dye, said motor fuel normally tending to deteriorate on exposure to sunlight, and containing small amounts of oleic acid and cresylic acid.

7. The method of stabilizing motor fuel normally tending to deteriorate on sunlight exposure, which comprises adding to said fuel small amounts of an unsaturated fatty acid and a phenol.

THOMAS CARL RODDY, Jr.

REFERENCES CITED

The following references are of record in the file of this patent:

UNITED STATES PATENTS

| Number | Name | Date |
|---|---|---|
| 2,149,221 | Lamping | Feb. 28, 1939 |
| 2,165,651 | Rees | July 11, 1939 |